United States Patent [19]

Yannone et al.

[11] 4,305,129
[45] Dec. 8, 1981

[54] SYSTEM FOR PROVIDING LOAD-FREQUENCY CONTROL THROUGH PREDICTIVELY AND DYNAMICALLY DISPATCHED GAS TURBINE-GENERATOR UNITS

[75] Inventors: Robert A. Yannone, Aldan; John F. Reuther, Penn Hills, both of Pa.

[73] Assignee: Westinghouse Electric Corp., Pittsburgh, Pa.

[21] Appl. No.: 111,417

[22] Filed: Jan. 11, 1980

Related U.S. Application Data

[63] Continuation of Ser. No. 846,043, Oct. 27, 1977, abandoned.

[51] Int. Cl.³ .............................................. F01D 17/04
[52] U.S. Cl. ............................... 364/492; 60/39.28 R; 290/40 R; 290/52
[58] Field of Search ................................ 364/492–494; 290/40 R, 52; 60/39, 28 R, 28 P

[56] References Cited

U.S. PATENT DOCUMENTS

| | | | |
|---|---|---|---|
| 3,974,643 | 8/1976 | Smith et al. | 60/39.28 R |
| 4,039,804 | 8/1977 | Reed et al. | 364/494 |
| 4,053,746 | 10/1977 | Braytenbah et al. | 364/49 X |
| 4,115,860 | 9/1978 | Atwater | 364/492 |
| 4,181,840 | 1/1980 | Osborne | 290/40 R |
| 4,208,591 | 6/1980 | Yannone et al. | 290/40 R |

*Primary Examiner*—Errol A. Krass
*Attorney, Agent, or Firm*—E. F. Possessky

[57] ABSTRACT

An optimized high load blocking limit is independently computer calculated for each gas turbine-generator unit as a dynamic function of combustor shell pressure and exhaust temperature every second. A low load blocking limit can be calculated as a function of the high blocking limit. The high and low dynamic limits then define a band of megawatts instantaneously available to the system. At the dispatch computer, load-frequency control is executed and the calculated load demands are dispatched to the various gas turbine-generator units which respond without exceeding the respective high and low load blocking limits. A turbine control unit load reference is modified by the dispatched load change and each unit load control operates its turbine fuel control valves to satisfy the load demand.

5 Claims, 9 Drawing Figures

FIG. 1.

SYSTEM BLOCK DIAGRAM

FLOW CHART

SYSTEM FOR PROVIDING LOAD-FREQUENCY CONTROL THROUGH PREDICTIVELY AND DYNAMICALLY DISPATCHED GAS TURBINE-GENERATOR UNITS

This is a continuation of application Ser. No. 846,043, filed Oct. 27, 1977, and now abandoned.

CROSS-REFERENCE TO RELATED APPLICATIONS

Ser. No. 319,114, entitled "Improved System and Method For Operating Industrial Gas Turbine Apparatus and Gas Turbine Electric Power Plants Preferably With A Digital Computer Control System", filed by T. Giras et al on Dec. 29, 1972 is hereby incorporated by reference.

BACKGROUND OF THE INVENTION

The present invention relates to load-frequency control (LFC) and more particularly to systems arranged to execute LFC actions through gas turbine-generator units.

Load-frequency control is needed in power systems to hold frequency substantially constant as load changes occur. LFC is typically performed by a dispatch computer and the load changes needed to control the system frequency are dispatched to the various plant locations for implementation by local plant controls.

Gas turbine-generator units have been used to execute LFC commands to obtain better system response to load demands and more efficient use of prime movers when used with or without steam turbine-generator units. For example, in the Jersey Central Power & Light system, LFC has been implemented through gas turbine-generator units. However, that implementation has been limited in efficiency because of the manner in which allowable turbine load limits are calculated and implemented.

SUMMARY OF THE INVENTION

The present invention provides a load-frequency control system for a power system having steam and gas turbine-generator units. Means are provided for controlling the load level of each of the gas turbine-generator units to satisfy a load reference applied thereto. The varying load references are generated for the respective units to provide for substantially constant system frequency substantially without exceeding a high load optimized blocking limit for each of the gas turbine-generator units. Means are also provided for generating representations of turbine exhaust temperature and combustor shell pressure for each unit, and the high blocking load limit is generated for each of the units as a function of the turbine exhaust temperature and the combustor shell pressure.

DESCRIPTION OF THE PREFERRED EMBODIMENT

Figure 1:
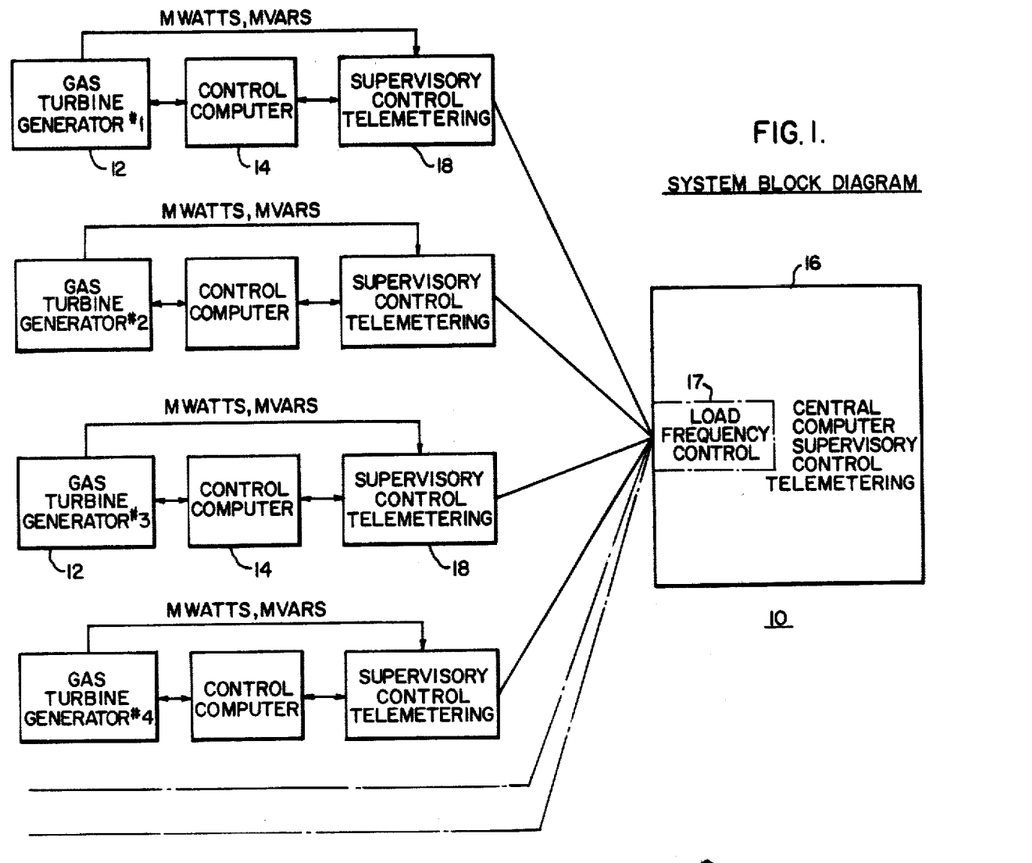
FIG. 1 shows a schematic diagram of a power system showing multiple gas turbines for use in LFC.

More particularly, there is shown in FIG. 1 a power generator system 10 having a plurality of gas turbine-generator units 12 located at one or more plants within the area supplied by the system 10. Steam turbine-generator units are not shown, but a number of such units are provided in the system 10 to meet base load requirements. Each gas turbine-generator unit 12 is provided with a conventional control system 14, in this case a digital computer control system.

A central supervisory control 16 includes a load/frequency control 17 and provides tieline interchange control and other control functions for the system 10. The control 16 includes conventional telemetering equipment for sending load dispatch signals to respective remote local supervisory controls 18 associated with the respective gas turbine-generator units 12. Plant signals including megawatts and megavar signals are transmitted back to the central control 16 from the local controls 18 for load dispatch calculations and other purposes.

Figure 2:
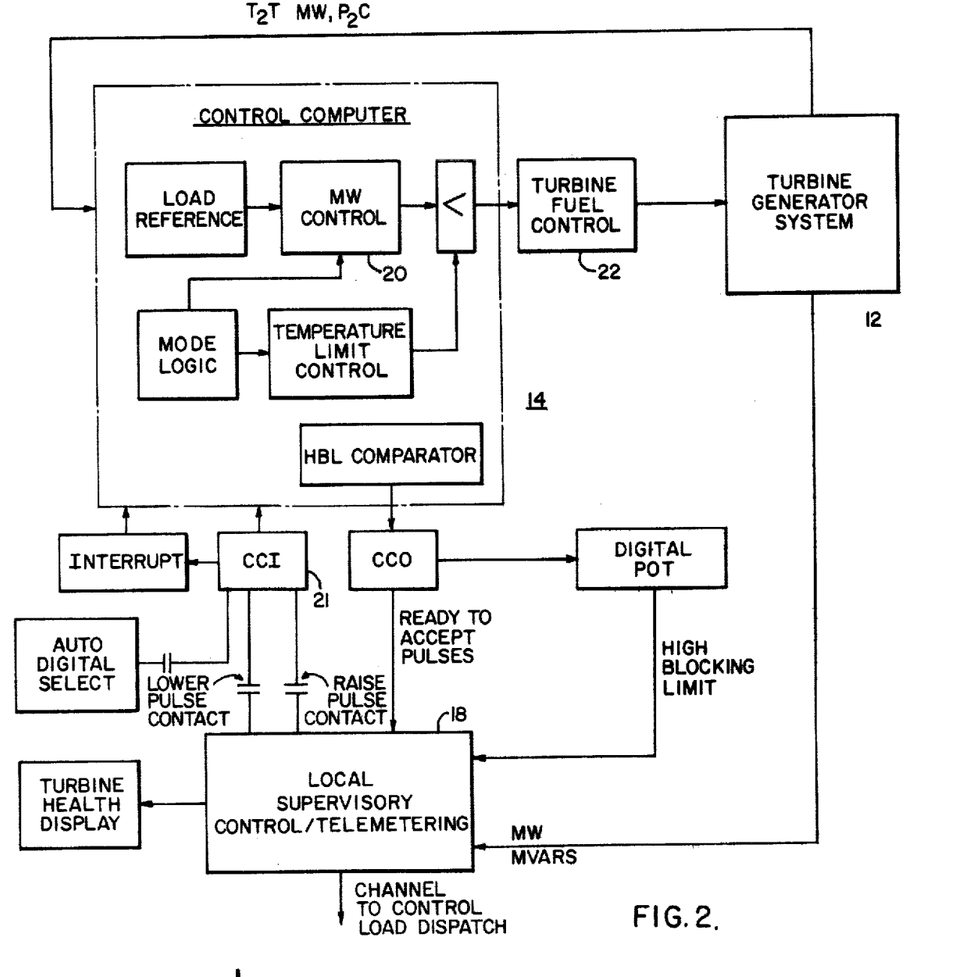
FIG. 2 shows a more detailed schematic of the power system showing features of the invention employed therein.

A more detailed block diagram is shown for the local control arrangement in FIG. 2. The control system 14 can be a conventional gas turbine computer control like that disclosed in the aforementioned U.S. Pat. Application Ser. No. 319,114. Basically, the computer control 14 responds to temperature, pressure, fuel and other plant feedback signals and to operator and central supervisory signals to control the turbine fuel and thereby the turbine speed and/or load. As shown, RAISE or LOWER pulses are applied to a contact closure input system 21 by the local supervisory control 18 when the central supervisory control 16 has dispatched an increase or decrease in the local turbine load in order to control system frequency as the system electrical load and/or power interchange with neighboring systems varies.

A megawatt control 20, disclosed in the aforementioned Ser. No. 319,114, causes a fuel control 22 to change the fuel flow to a level which satisfies the megawatt load level setpoint as it is changed by incoming supervisory increase or decrease pulses. Normally, each supervisory pulse represents a demand for a load change equal to a predetermined number of megawatts.

To provide faster, more efficient and generally better system frequency control, the system 10 determines how much load each gas turbine-generator unit 12 can provide on the basis of its current operating condition. The system thus dynamically determines allowable loading on each turbine 12 in accordance with the physical health of the turbine and in accordance with ambient variables. Thus, as ambient conditions vary, and as gas turbine combustion efficiency, turbine blade performance, compressor fouling and other turbine health variables change with time, a high blocking limit, i.e., the turbine load capability, is continuously redetermined as a function of compressor discharge pressure and turbine-exhaust temperature and transmitted to the central supervisory control 16 where load commands are calculated and dispatched to the gas turbine-generator units 12 on the basis of the respective high blocking limits. The respective gas turbines 12 move under local megawatt control to the dispatched load levels which are either at or below the respective high blocking limits, thereby normally achieving load/frequency control quickly on a feedforward basis without incurring local trim action by exhaust temperature limit control. Thus, the use of the calculated high blocking limit for each turbine 12 in the dispatch calculations assures that the dispatched load for each gas turbine 12 will not exceed its high blocking limit, and further that each turbine 12 will not exceed its exhaust temperature limit when it is dispatched to move to a higher load no greater than its high blocking limit. With the use of the gas turbines 12 for frequency control, better system response and efficiency are realized as compared to the use of steam turbines for frequency control.

As an example, a gas turbine-generator unit may normally be capable of generating 100 MW at 80° F. or 80 MW at 105° F. Once the turbine has been in use for some time, its physical state may be such that at 105° F. it can only generate no more than 65 MW without exceeding exhaust temperature limits. With the control system disclosed herein, the reduced turbine operating capability is reflected as a dynamically calculated and reduced high load blocking limit which prevents the dispatch of over-limit load increases that cannot be met by that turbine.

An additional feature of the system is that it can include a turbine health monitor, i.e., a display which compares the current high blocking limit (HBL) to the rated or normal high blocking limit at the current ambient conditions. For this purpose, the local computer can keep in storage a curve representing the HBL values for the turbine at the start of life, i.e., HBL as a function of turbine exhaust temperature. In the alternative, the curve can be HBL as a linear function of compressor inlet temperature (see infra) as of the start of turbine life. The computer generates outputs corresponding to the actual and the stored HBL value for display.

Figure 3:
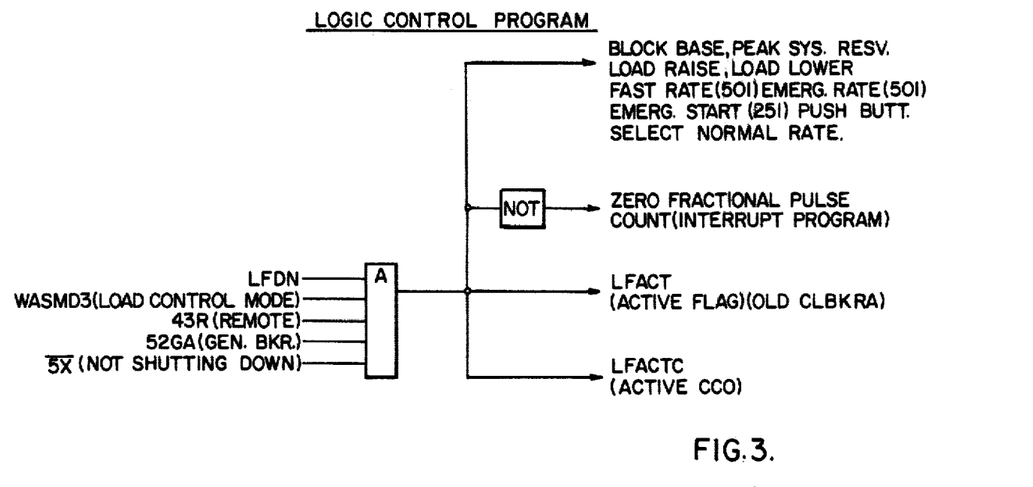
FIGS. 3-5 show block diagrams of logic functions employed in the system.
Figure 4:
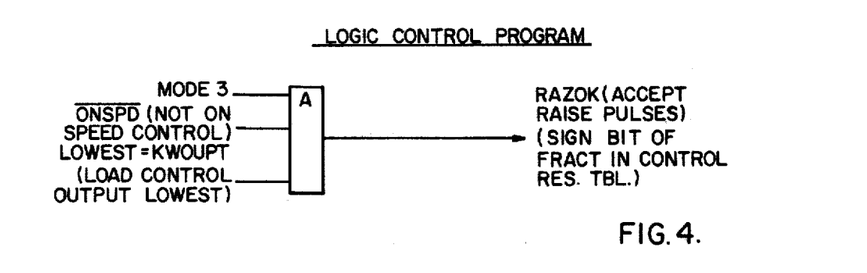
Figure 5:
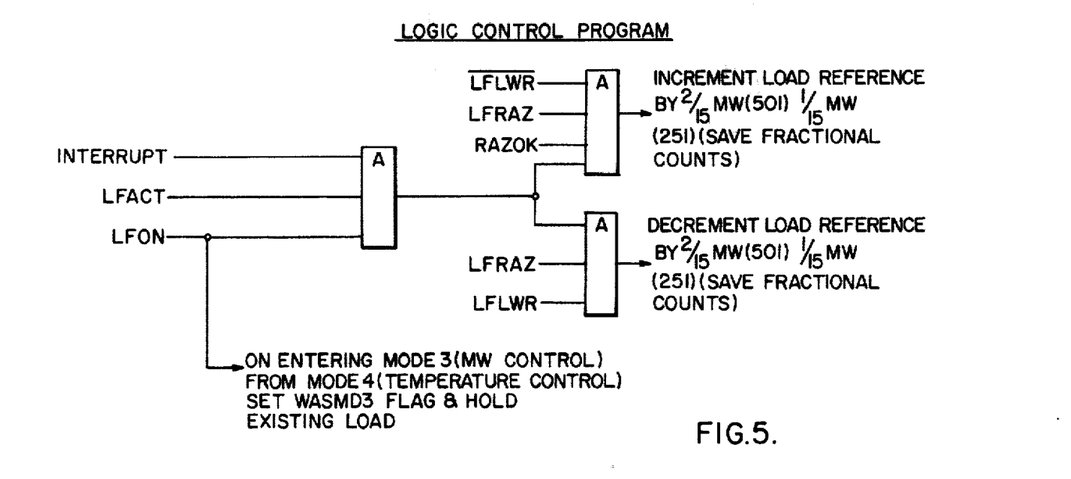

To plce an individual gas turbine-generator 12 in the load/frequency control mode, the operator pushes an Automatic Dispatch push button, and computer control logic operations are initiated as shown in FIG. 3. If the turbine has been in temperature control, it is switched to megawatt control (Mode 3) and the load reference is set to a preset level below the high blocking limit to allow some range for frequency regulation. A block is placed on certain operations such as base mode, peak system reserve mode, manual load raise or lower, etc. as shown in FIG. 3. As shown in FIG. 4, computer logic operations allow acceptance of dispatch raise or lower pulses, and FIG. 5 shows the logic employed in the computer to process raise or lower dispatch pulses as received. Each pulse signifies a fixed megawatt change and the load reference for the megawatt control is adjusted accordingly.

In the prior art, a static high blocking limit has been determined from compressor inlet temperature. Thus, the prior art high blocking limit is based on the decrease in rated megawatts as the compressor inlet temperature increases. This temperature ($T_1T$) is measured and the high blocking limit is generated as a linear function of $T_1T$. Since it is a static calculation, the line must be adjusted from time to time to take into account factors like turbine aging, change of fuel and, to a lesser extent, change in barometric pressure.

Figure 6:
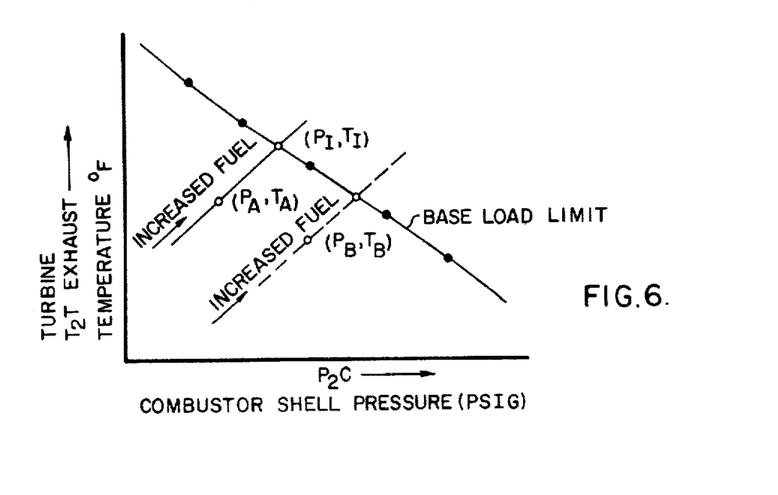
FIGS. 6 and 7, respectively, show a base load limit curve and a flow chart used in the computation of a high load blocking limit.

In accordance with the present invention, a high blocking limit is calculated dynamically to provide better system efficiency. Thus, as fuel is increased, combustor shell pressure and exhaust temperature increase is approximately a linear function. So that the design value for turbine inlet temperature is not exceeded, the maximum allowable exhaust temperature is defined by a loading curve as a function of combustion shell pressure. The loading curve is approximated as four straight line segments as shown in FIG. 6. Curves allowing higher turbine inlet temperatures at a cost of higher maintenance costs are available but only the lowest or base load curve is shown.

In FIG. 6, there is shown a plot of the base load curve and a loading line, the locus of points plotting exhaust temperature ($T_2T$) vs combustor shell pressure ($P_2C$) as fuel is varied. The point where the two intersect ($P_IT_I$) is the point where base load is reached and temperature control limits further increase. If other ambient temperatures and/or other turbine efficiency conditions exist, a different but essentially parallel loading path through ($P_BT_B$) is followed (dotted line) giving a different intersection. The slope of the loading line is characteristic to the turbine and is empirically determined. Since there is good correlation between change in exhaust temperature and change in megawatts, calculating the temperature at the intersection gives the maximum allowable increase in exhaust temperature. The available increase in megawatts can be predicted from the present megawatts, the combustor shell pressure and the exhaust temperature and the maximum allowable exhaust temperature increase.

Figure 7:
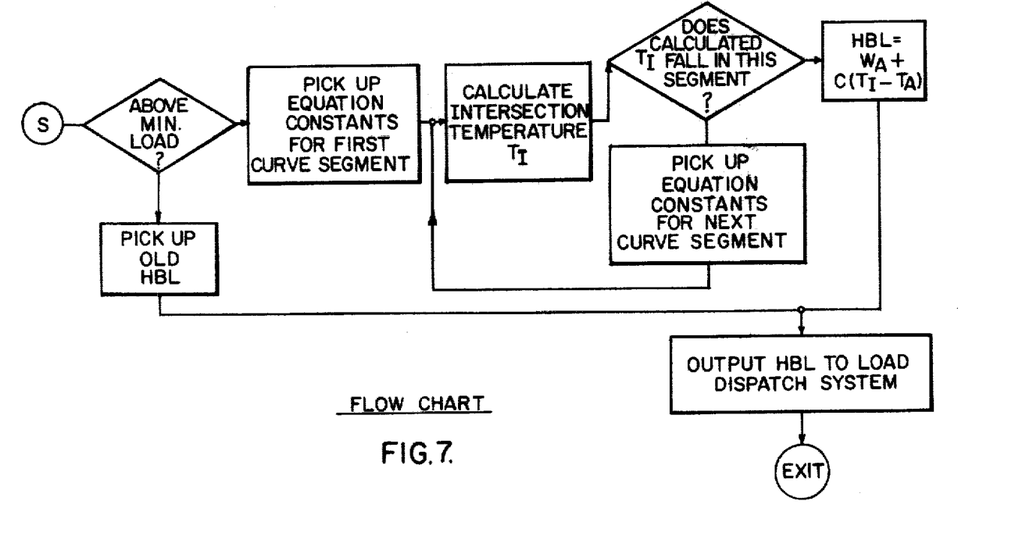

The present megawatts plus the available increase in megawatts becomes the high blocking limit which is telemetered to the central load dispatch system. FIG. 7 shows a flow chart for the described basic logic operations performed in calculating HBL.

From knowledge of the present operating conditions $P_A$, $T_A$ and $W_A$ (megawatts), the intersection temperature can be shown to be calculated as $T_I = d\, T_A + e\, P_A + f$ where d, e, and f are constants. Since different constants are needed for each loading curve segment, there are four sets of constants $d_n$, $e_n$, $f_n$ where n = 1, 2, 3 and 4. A calculation is made for the one set of constants and if $T_I$ does not fall in the first segment, calculations are made for succeeding segments until the actual intersection on the segment matching the constants is found. From there, the high blocking limit is calculated as $HBL = W_A + C(T_I - T_A)$ where C is a constant.

Calculations update the HBL at regular intervals anytime the unit is above a predetermined load level such as minimum load. The low blocking limit can be calculated locally or remotely for narrow band limiting as either $LBL = a$, or $LBL = HBL = a_2$ or $LBL = N_3(HBL)$ where $a_1$, $a_2$ are constants. For wide band limiting, LBL can be made equal to the minimum load value specified for the turbine. A program listing for the limit calculations is included below.

The following calculations are used to determine constants needed to predict allowable increase in exhaust temperature, hence megawatts.

Figure 9:
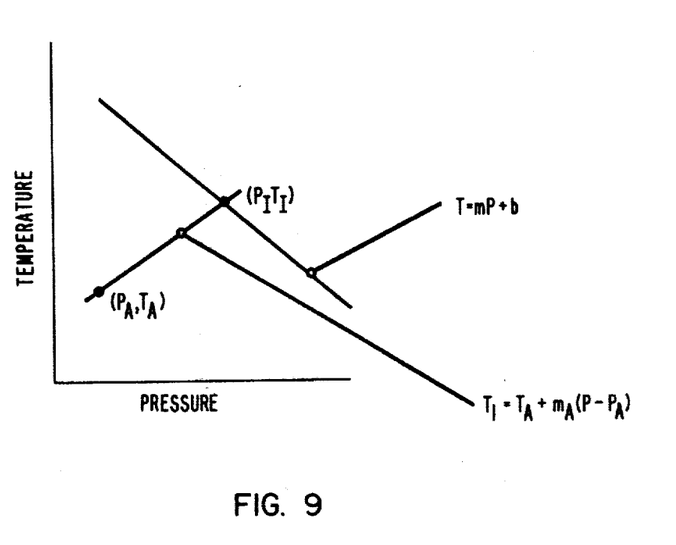
FIG. 9 shows a graph used in predicting allowable exhaust temperature increases.

At intersection, ($P_IT_I$) FIG. 9:

$$mP_I + b = T_A + m_A(P_I - P_A) = T_A + m_A P_I - m_A P_A$$

$$mP_I - m_A P_I = T_A - m_A P_A - b$$

$$P_I(m - m_A) = T_A - m_A P_A - b$$

$$P_I = \frac{T_A - m_A P_A - b}{(m - m_A)}$$

-continued $$T_I = mP_I + b$$

$$T_I = \frac{m}{m - m_A} (T_A - m_A P_A - b) + b$$

$$= \frac{m}{m - m_A} (T_A - m_A P_A) - \frac{m\,b}{m - m_A} + b$$

$$= \frac{m}{m - m_A} (T_A - m_A P_A) + \frac{-m_A b}{m - m_A}$$

$$= \frac{m}{m - m_A} (T_A - m_A P_A) - \frac{m_A b}{m - m_A}$$

$$T_I = \frac{m}{m - m_A} T_A - \frac{m m_A}{m - m_A} P_A - \frac{m_A b}{m - m_A}$$

$$= d\,T_A + e\,P_A + f$$

Figure 8:
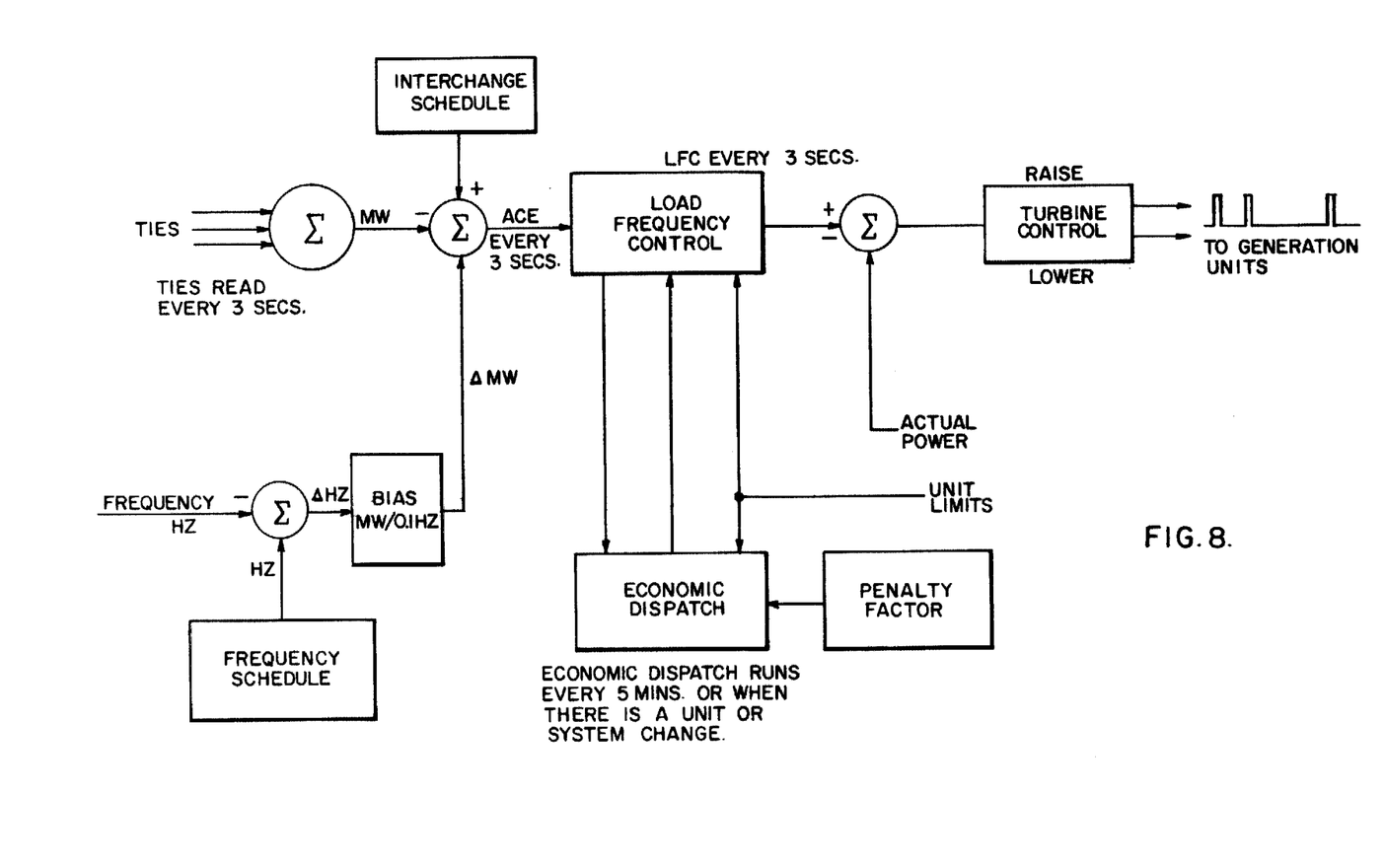
FIG. 8 shows a basic flow chart for an LFC program used in the system.

At the dispatch computer 16, the LFC program computes load changes needed for frequency control and schedules load changes for individual units 12 to satisfy the total load change requirement within the constraints of the HBL values received from the various units 12. In FIG. 8 a general block diagram is shown for an LFC subsystem.

AREA CONTROL ERROR (ACE)

The Area Control Error (ACE) program calculates the control error which the AGC system must minimize. To provide better control action, a controller algorithm is used on the ACE value to provide a smoothed, predicted, and compensated ACE. This value is used by the LFC program to regulate the generating units.

The area control error is the change in generation necessary to meet scheduled frequency and scheduled net interchange. The sign convention is as follows:

Positive = Excess generation, power flow out of area.
Negative = Deficiency in generation, power flow into area.

The equation is:

$$E_A = \Sigma P_T(1) - P_S + B(F - F_S)$$

where:
$P_T(1)$ = Flow on tie 1
$P_S$ = Net Scheduled Interchange
B = Frequency Bias
F = System Frequency
$F_S$ = Scheduled Frequency Provision is made for considering different modes of control in the calculation.

LOAD FREQUENCY CONTROL PROGRAM

The purpose of the Load Frequency Control (LFC) Program is to calculate and assign megawatt output required from each generating unit to satisfy operating area control needs. The program uses several input values describing the current power requirement and the status of the generating units, and then determines each unit's assigned power. The power assignment is calculated according to the unit's economic point as decided by the Economic Dispatch Control (EDC) Program or the operator.

The power difference between the economic operating point and the total required power for the area is calculated. This power deviation is distributed to the various units according to a unit participation factor and the dynamic limits of the individual units. Each unit's economic operating point is then adjusted to absorb the power deviation to satisfy the total power requirement. However, if the sum of the participation factors is not 100 percent, or one or more units have exceeded the unit's allowable dynamic limits (as calculated in accordance with the present invention), the total power generation requirement may not be satisfied in the first assignment pass. In such cases, the LFC program adjusts the total power deviation and attempts to redistribute the power deviation to those units which can still handle it. Several iterations may be required, terminating when the difference between the generated and the required power is less than some acceptable error. Should the program fail to achieve total power within a fixed number of iterations, a nonconvergence alarm is initiated.

The program also checks the changes in certain system parameters over prescribed time intervals. If these changes become excessive, a new Economic Dispatch calculation will be made. This will also apply if a unit is added to or deleted from those being direct digitally controlled.

The basic function of the LFC can be stated as follows:

Power to be assigned = the sum of actual power of all BASE or AUTO minus smoothed and predicted area control error.

Regulating Power = power to be assigned minus the base settings of units on BASE or AUTO.

ECONOMIC DISPATCH CALCULATION PROGRAM

The function of the Economic Dispatch Control (EDC) Program is to calculate the economic loading point for the various generating units. The results of this calculation are used by the Load Frequency Control (LFC) Program to regulate the power assignment based on the economic loading points to satisfy the area requirement. The results of the Pass II calculation are used by the operator to manually control the generating units in the fixed load mode.

To save running time, the program consists of two separate routines. The first calculates the incremental cost curve anytime pertinent parameter changes. Incremental heat rate curves are stored on RAD in the form of line segments (slope-intersect). This routine is run anytime the fuel cost has changed, or a heat rate curve has been modified. The fuel costs are modified via the dispatch console.

The second routine is the normal EDC economic loading calculation. A trial value of Lambda is assumed and each cost curve is entered to obtain the designed power. If the sum of the assigned power equals the required value wihin a specified boundary, the value of Lambda is correct and the solution is valid. If not, Lambda is increased or decreased and the numerical process is continued until the error criteria is satisfied. A binary search procedure is used to ensure rapid convergence and minimum running time. If the assigned power is outside the specified limits, it is set equal to that limit. If the required power cannot be reached within the limit calculated as described herein for the various units, an alarm message is output and no results are stored for the LFC program.

EDC is normally requested to execute at regular intervals. However, the program may also be requested by either the LFC Program or the operator. LFC bids indirectly for the EDC Program whenever the system operating point has drifted too far from the economic operating point. The operator may request EDC whenever the economic loading points of the generating units must be updated.

EDC calculates the economic loading points for each generating unit placed on AUTO control. The economic calculations are based on the principles of Incremental Loading, to achieve minimum overall fuel costs for a given System demand. The calculations recognize the most limiting unit constraints, unit fuel costs, and transmission loss penalty factors.

EDC dispatches a total system load, determined by LFC, among the available units. The program runs as requested on the basis of time, and/or megawatts change, and/or a flag due to an operator request. The desired power is obtained from LFC and the results, the desired power for each unit, are stored for LFC for consolidation.

TURBINE CONTROL PROGRAM AND PULSE TO SUPY ROUTINE

The function of the Turbine Control Program is to compute unit error and the required control action in terms of raise or lower pulse rates. Turbine control action is computed every four seconds, but the response to a pulse rate by a typical turbine extends over several four second periods. It is therefore necessary to prevent the overcorrection which would result if pulsing were based only on instantaneous error. The possibility of using faster pulse rates is ruled out. They are detrimental to the speed of response and, thus, to regulation of the power system; and they also cause excessive thermal cycling in the gas turbine.

In the use of the mode feedback (anticipation), a simple model of the turbine is employed to anticipate changes in generation. The model used is a simple exponential decay, such that if correctly adjusted, the sum of actual plus anticipated power is constant.

The equations used in the program are:
ANTIC(N) = ANTIC(N − 1)*DECAY
ERROR = DESP − (ACTP + ANTIC(N))
ANTIC(N) = ANTIC(N) + ERROR
PULSE = ERROR*CONV
where:
DESP = Desired Power (Setpoint from LFC)
ACTP = Actual Power (Feedback from REDAC 70 data point)
ANTIC = Anticipated Change in Actual Power from previous pulse(s)
DECAY = Exponential Decay in 4 sec.
CONV = Pulses/MW
PULSE = Output Pulse Rate ANTIC is the anticipation term and represents the effect on the unit still to be produced by the previous pulses.

The first equation above shows how much ANTIC should have changed in the 4 sec. since the last pulse rate due to the response of the unit over time. The third equation above gives the total movement of the unit (occurring over a few control cycles) due to the pulse rate output previously and the pulse rate now about to be output.

For the model feedback rate to be effective, it is important that the CONV term represent an accurate conversion of pulse rate to megawatt error and that the DECAY term correspond to the actual dynamics of the turbine. While these terms are not constant over the entire range of turbine output, sufficient accuracy can be obtained by using a DECAY which is average over typical operating range, and CONV at the most responsive region.

The sustained rate of change of a controlled unit is limited by the Turbine Control program. The predetermined maximum sustained (thermal recovery) rate is stored for each unit as RATE in MW per 4 seconds. The rate limiting is mechanized by modeling the available step change of the gas turbines. When a pulse is sent out, the program considers that the available step has been reduced and that it will return to normal at the sustained rate of change described above. Although this use of available step as a physical entry applies only to increase in turbine output, it is used mathematically to limit changes in either direction.

In the computation of pulses, the available step (QUADN, QUAP) is taken into account as follows:
MAX RAISE PULSE = QAUP (Positive)
MAX LOWER PULSE = QADN (Negative)

The magnitudes of QAUP and QADN build up to QMAX so that when no available step has been used, a step of QMAX (in MW) can be made in either direction. QMAX, then, is the maximum instantaneous change capability of the turbine-generator combination. The available step is updated each control cycle, after the development of pulses and the calculation of anticipation.

APPENDIX

The following is a program listing usable in making HBL calculations:

```
00011   C       SAMPLE CALCULATION OF HIGH BLOCKING LIMIT
00021   C
00031           REAL P(5),T(5),M(4),B(4),MA,PA,TA,D(4),E(4),F(4),TI,WA,WMIN,HBL,PI
00041           DATA ILO/21/
00051   C       SPECIFY BASE LOAD CURVE
00061           DATA P/125,0,133,0,141,0,149,0,156,0/
00071           DATA T/956,0,936,0,919,0,906,0,895,0/
00081   C       SPECIFY RELATIONSHIP BETWEEN LOAD AND EXHAUST TEMP, - MW/DEGREE F
00091           DATA C/.0555/
00101   C       SPECIFY TYPICAL OPERATING POINT
00111           DATA PA,TA,WA/130,0,890,0,28,0/
00121   C       SPECIFY MINIMUM LOAD BELOW WHICH OLD HIGH BLOCKING LIMIT IS USED
00131           DATA WMIN/2,50/
00141   C       INITIALIZE HIGH BLOCKING LIMIT (HBL)
00151           DATA HBL/30,0/
00161   C       SPECIFY SLOPE OF LOADING LINE - DEGREES/PSIG
00171           DATA MA/8,000/
00181   C       CALCULATE BASE LOAD SEGMENT SLOPES (M) AND INTERCEPTS (B)
00191           DO 1 I=1,4
00201           M(I) = (T(I+1)−T(I))/(P(I+1)−P(I))
```

```
00211            B(I) = T(I)-M(I)*P(I)
00221          1 CONTINUE
00231    C
00241    C      CALCULATE D,E AND F CONSTANTS USED TO CALC. LOAD LINE INTERCEPT
00251            DO 2 I=1,4
00261            D(I) = M(I)/M(I)-MA)
00271            E(I) = -M(I)*MA/(M(I)-MA)
00281            F(I) = -MA*B(I)/(M(I)-MA)
00291          2 CONTINUE
00301    C
00311    C      THE ABOVE WOULD BE DATA FED INTO THE CONTROL COMPUTER
00321    C      THE CALCULATIONS BELOW WOULD BE EXECUTED WITHIN THE CONTROL COMP.
00331    C
00341    C      CHECK TO SEE IF A NEW HBL SHOULD BE CALCULATED
00351    C
00361            IF (WA,LE,WMIN) GO TO 8
00371    C      CALCULATE PREDICTED LOAD CURVE INTERCEPT PI,TI
00381            DO 6 I=1,4
00391            TI = D(I)*TA+E(I)*PA+F(I)
00401            PI = (TI-B(I))/M(I)
00411            IF (TI,LE,T(I+1)) GO TO 7
00421          6 CONTINUE
00431    C      CALCULATE HIGH BLOCKING LIMIT
00441          7 HBL = WA+C*(TI-TA)
00451    C      INSTEAD OF OUTPUTTING HBL TO THE LOAD/FREQ CONTROL,
00461    C      PRINT VARIOUS DATA
00471    C
00481    C      EJECT PAGE
00491          8 WRITE (ILO,100)
00501        100 FORMAT (1H1)
00511    C      PRINT BASE LOAD LINE COORDINATES
00521            WRITE (ILO,101) P
00531        101 FORMAT (' BASE LOAD LINE PRES, COORDINATES ',5F10,1)
00541            WRITE (ILO,102) T
00551        102 FORMAT (' BASE LOAD LINE TEMP. COORDINATES ',5F10,1)
00561    C      PRINT OPERATING DATA
00571            WRITE (ILO,103) PA,TA
00581        103 FORMAT (' P2C =',F6,1,' AVG. EXH. TEMP. -',F7,0)
00591    C      PRINT M AND B CONSTANTS
00601            WRITE (ILO,109) M
00611        109 FORMAT (' M CONSTANTS ',4F12,5)
00621            WRITE (ILO,110) B
00631        110 FORMAT (' B CONSTANTS ',4F12,5)
00641    C      PRINT D, E AND F CONSTANTS
00651            WRITE (ILO,106) D
00661        106 FORMAT (' D CONSTANTS ',4F12,5)
00671            WRITE (ILO,107) E
00681        107 FORMAT (' E CONSTANTS ',4F12,5)
00691            WRITE (ILO,108) F
00701        108 FORMAT (' F CONSTANTS ',4F12,5)
00711    C      PRINT INTERCEPT
00721            WRITE (ILO,014) PI,TI
00731        104 FORMAT (' INTERCEPT - PRES. =',F6,1,' TEMP. =',F6,1)
00741    C      PRINT HIGH BLOCKING LIMIT
00751            WRITE (ILO,105) HBL
00761        105 FORMAT (' THE HIGH BLOCKING LIMIT =',F6,1)
00771            CALL EXIT
00781            END
```

| | | | | | |
|---|---|---|---|---|---|
| BASE LOAD LINE PRES. COORDINATES | 125.0 | 133.0 | 141.0 | 149.0 | 156.0 |
| BASE LOAD LINE TEMP. COORDINATES | 956.0 | 936.0 | 919.0 | 906.0 | 895.0 |
| P2C = 130.0 AVG, EXH, TEMP, = 890, MEGAWATTS = 28.0 | | | | | |
| M CONSTANTS | -2,50000 | -2,12500 | | -1,62500 | -1,57143 |
| B CONSTANTS | 1268,50000 | 1218,62500 | | 1148,12500 | 1140,14282 |
| D CONSTANTS | 0,23810 | 0,20988 | | 0,16883 | 0,16418 |
| E CONSTANTS | -1,90476 | -1,67901 | | -1,35065 | -1,31343 |
| F CONSTANTS | 966,47607 | 962,86414 | | 954,28564 | 952,95520 |
| INTERCEPT - PRES. = 135,1 TEMP, = 930,8 | | | | | |
| THE HIGH BLOCKING LIMIT = 30,3 | | | | | |

What is claimed is:

1. A load-frequency control system for a power system having steam and gas turbine-generator units, said control system comprising a plurality of gas turbine-generator units, means for controlling the load level of each of said gas turbine-generator units to satisfy a load reference applied thereto, means for generating the load references for the respective units to provide for a substantially constant system alternating frequency of predetermined value substantially without exceeding a high blocking limit for each of said units, means for generating a representation of turbine exhaust temperature and combustor shell pressure for each unit, and means for dynamically generating the high blocking limit for each of said units as a function of the turbine exhaust temperature and the combustor shell pressure.

2. A system as set forth in claim 1 wherein a low blocking limit is also generated for each gas turbine-generator unit for implementation through said load reference generating means.

3. A system as set forth in claim 1 wherein a central load dispatch computer includes load-frequency control means for generating load increase-decrease signals for the gas turbine-generator units, each of said gas turbine-generator units includes a local control system including said load level controlling means and said high blocking limit generating means, and means are provided for transmitting signals representing the high blocking limits to said dispatch computer and the load increase-decrease signals to said local control systems.

4. A system as set forth in claim 1 wherein health monitor display means are provided for displaying a comparison between the dynamically determined high blocking limit and a stored expected value for the high blocking limit at the measured turbine exhaust temperature and existing ambient temperature.

5. A system as set forth in claim 1 wherein means are provided for generating a representation of actual megawatts for each unit, the high blocking limit is dynamically determined for each unit by adding measured megawatts to available increase in megawatts, and the available increase in megawatts is determined for each unit as the intersection of a stored characteristic temperature limit versus combustor shell pressure loading curve for the gas turbine and a loading line having a predetermined slope and extending from the measured exhaust temperature value through the characteristic temperature limit curve.

* * * * *